(12) United States Patent
Suzuki et al.

(10) Patent No.: US 10,369,812 B2
(45) Date of Patent: Aug. 6, 2019

(54) IMAGE DATA GENERATION METHOD, STRUCTURE FORMATION METHOD, STRUCTURE FORMATION APPARATUS, AND COMPUTER-READABLE STORAGE MEDIUM

(71) Applicant: CASIO COMPUTER CO., LTD., Shibuya-ku, Tokyo (JP)

(72) Inventors: Katsunori Suzuki, Higashimatduyama (JP); Hitomi Fujimoto, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 359 days.

(21) Appl. No.: 15/372,361

(22) Filed: Dec. 7, 2016

(65) Prior Publication Data

US 2017/0195522 A1 Jul. 6, 2017

(30) Foreign Application Priority Data

Jan. 5, 2016 (JP) .................................. 2016-000752
Nov. 30, 2016 (JP) .................................. 2016-232577

(51) Int. Cl.
  *B29C 67/00* (2017.01)
  *B41J 11/00* (2006.01)
  (Continued)

(52) U.S. Cl.
  CPC ........... *B41J 11/002* (2013.01); *B29C 64/386* (2017.08); *B41J 2/01* (2013.01); *B41J 3/32* (2013.01);
  (Continued)

(58) Field of Classification Search
  CPC . B41J 11/002; B41J 2/01; B41J 2/2054; B41J 3/32; B41M 3/16; G03G 15/224; B29C 64/386
  (Continued)

(56) References Cited

U.S. PATENT DOCUMENTS 8,870,327 B2  10/2014  Kanamura et al.
9,162,486 B2  10/2015  Motoyanagi
(Continued)

FOREIGN PATENT DOCUMENTS

JP  2002099181 A  4/2002
JP  2012171317 A  9/2012
JP  2015071286 A  4/2015

OTHER PUBLICATIONS

Japanese Office Action dated Jun. 26, 2018 (and English translation thereof) issued in counterpart Japanese Application No. 2016-232577.

Primary Examiner — Joseph S Del Sole
Assistant Examiner — Lawrence D. Hohenbrink, Jr.
(74) Attorney, Agent, or Firm — Holtz, Holtz & Volek PC

(57) ABSTRACT

A computer 10 generates image data of a density image to be printed on a print medium M including an expansion layer M1 that expands by heating. First density image data for printing on one surface FS of the print medium M to expand the expansion layer M1 is prepared first. The first density image data is then converted so that the density of a part of a target region having the same density included in a first density image P1 represented by the first density image data is higher than the density of the other part of the target region, to generate third density image data.

20 Claims, 6 Drawing Sheets

(51) Int. Cl.
*B41J 2/01* (2006.01)
*B29C 64/386* (2017.01)
*B41J 3/32* (2006.01)
B41J 2/205 (2006.01)
G03G 15/22 (2006.01)
B41M 3/16 (2006.01)

(52) U.S. Cl.
CPC .............. *B41J 2/2054* (2013.01); *B41M 3/16* (2013.01); *G03G 15/224* (2013.01)

(58) Field of Classification Search
USPC .............................. 425/174.4, 375; 264/308
See application file for complete search history.

(56) References Cited

U.S. PATENT DOCUMENTS

2012/0218338 A1* 8/2012 Kanamura .............. B41J 3/407
347/15
2013/0161874 A1* 6/2013 Horiuchi .............. B29C 44/022
264/415

* cited by examiner

L1

L3

D1

D3

IMAGE DATA GENERATION METHOD, STRUCTURE FORMATION METHOD, STRUCTURE FORMATION APPARATUS, AND COMPUTER-READABLE STORAGE MEDIUM

CROSS-REFERENCE TO RELATED APPLICATIONS

This application is based upon and claims the benefit of priority from the prior Japanese Patent Application No. 2016-000752, filed Jan. 5, 2016, and Japanese Patent Application No. 2016-232577, filed Nov. 30, 2016, the entire contents of which are incorporated herein by reference.

BACKGROUND OF THE INVENTION

1. Field of the Invention

The present invention relates to an image data generation method, a structure formation method, a structure formation apparatus, and a program.

2. Description of the Related Art

As one of the structure formation techniques, a technique of printing, in black ink or toner, a desired pattern on a print medium including an expanding layer that expands by heating and then irradiating the print medium uniformly with light is known. This technique utilizes the property that a region printed in black ink or toner has higher light absorptivity than a region not printed in black ink or toner and, as a result of absorbed light being converted into heat, the region printed in black ink or toner is heated to high temperature and thus expands and rises. Japanese Patent Application Laid-Open No. 2012-171317 describes a three-dimensional printer using this technique.

A structure in which the surface of the print medium rises outward in the thickness direction can not only provide visual information but also provide tactile information to a person who touches the structure. Therefore, the aforementioned structure formation technique for forming a structure using printing technology is widely expected to be used in fields such as braille and tactile graphics. The structure formation technique has, however, the following problem: a structure formed by the technique is relatively not sharp in its cross-sectional shape, and so is relatively hard to be perceived by the sense of touch.

In view of such circumstances, the present invention has an object of providing an image data generation method, structure formation method, structure formation apparatus, and program that can form a structure relatively easy to be perceived by the sense of touch.

SUMMARY OF THE INVENTION

According to one aspect of the present invention, an image data generation method in a structure formation apparatus includes: preparing first density image data for printing on a surface of a print medium including an expansion layer to expand the expansion layer, the surface being on a side of the print medium where the expansion layer is located, and the expansion layer expanding by heating; and converting the first density image data so that density of a part of a target region having same density in a first density image represented by the first density image data is higher than density of an other part of the target region, to generate third density image data.

According to one aspect of the present invention, a structure formation apparatus includes a control unit configured to: prepare first density image data for printing on a surface of a print medium including an expansion layer to expand the expansion layer, the surface being on a side of the print medium where the expansion layer is located, and the expansion layer expanding by heating; and convert the first density image data so that density of a part of a target region having same density in a first density image represented by the first density image data is higher than density of an other part of the target region, to generate third density image data.

According to one aspect of the present invention, a computer-readable storage medium for controlling a structure formation apparatus including a control unit includes: a process of preparing first density image data for printing on a surface of a print medium including an expansion layer to expand the expansion layer, the surface being on a side of the print medium where the expansion layer is located, and the expansion layer expanding by heating; and a process of converting the first density image data so that density of a part of a target region having same density in a first density image represented by the first density image data is higher than density of an other part of the target region, to generate third density image data.

According to the present invention, it is possible to provide an image data generation method, structure formation method, structure formation apparatus, and program that can form a structure relatively easy to be perceived by the sense of touch.

DETAILED DESCRIPTION OF THE INVENTION

Figure 1:
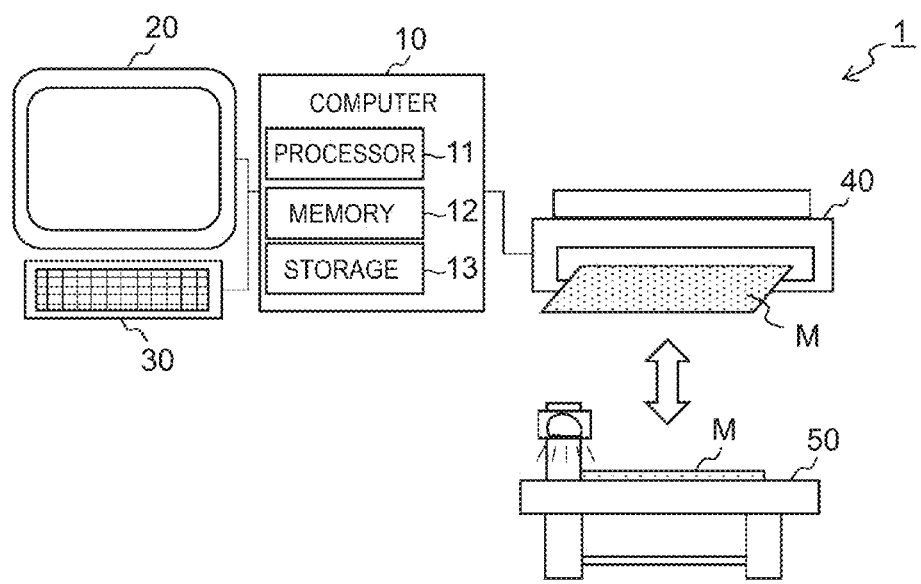
FIG. 1 is a diagram illustrating the configuration of a structure formation system according to an embodiment.
Figure 2:
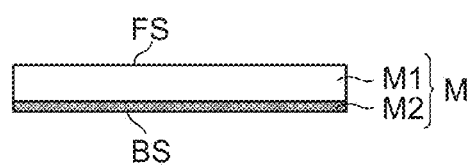
FIG. 2 is a diagram illustrating the configuration of a print medium.
Figure 3:
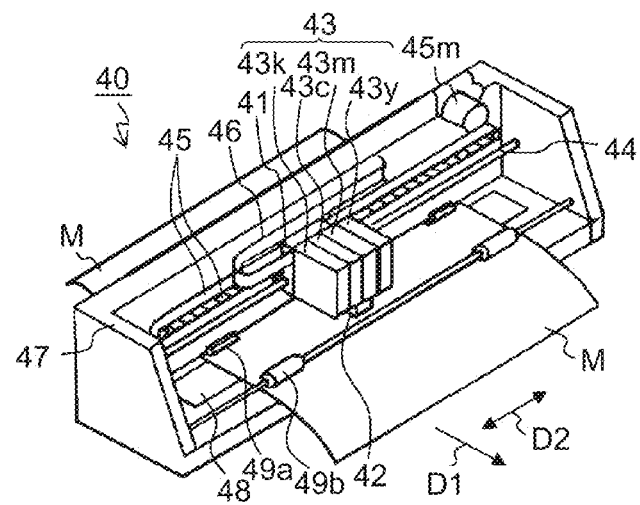
FIG. 3 is a diagram illustrating the configuration of a printer.
Figure 4:
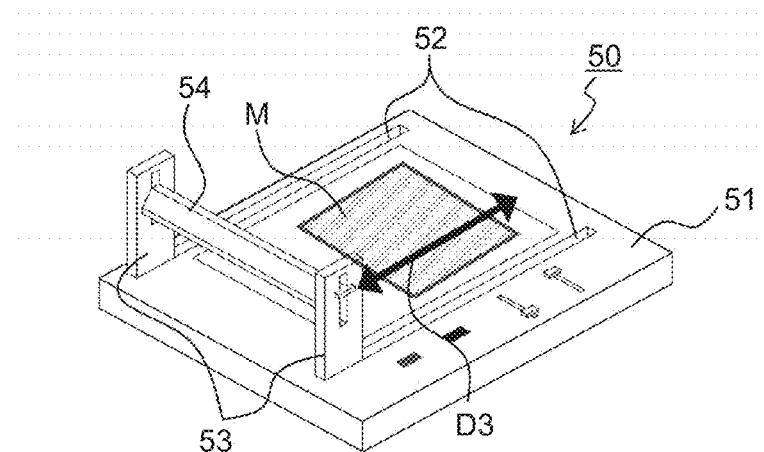
FIG. 4 is a diagram illustrating the configuration of a heater.

FIG. 1 is a diagram illustrating the configuration of a structure formation system 1. FIG. 2 is a diagram illustrating the configuration of a print medium M. FIG. 3 is a diagram illustrating the configuration of a printer 40. FIG. 4 is a diagram illustrating the configuration of a heater 50.

The structure formation system 1 is a structure formation apparatus including a computer 10, a display device 20, an input device 30, a printer 40, and a heater 50, as illustrated in FIG. 1. The structure formation system 1 prints a density image generated by the computer 10 on the print medium M by the printer 40, and heats the print medium M with the density image printed thereon by the heater 50 to cause the surface of the print medium M to rise, thus forming a structure in the print medium M. The structure formation system 1 further prints a color image generated by the computer 10 on the printer 40 by the printer 40, thus coloring the structure.

The print medium M is a thermal expansion sheet having a multilayer configuration in which an expansion layer M1 is stacked on a base material M2, as illustrated in FIG. 2. The expansion layer M1 is a layer of thermoplastic resin containing countless microcapsules that expand by heating, and expands according to the amount of heat absorbed. For example, the expansion layer M1 expands when irradiated with electromagnetic waves and heated. The base material M2 is made of, for example, paper, cloth such as canvas, or a panel material such as plastic, although the material is not particularly limited. A density image having a pattern of shading of black is printed on each a surface FS of the expansion layer M1 which is a first surface and a surface BS of the base material M2 which is a second surface, as described later. In this specification, the expression "form a structure" means to cause the surface of the print medium M to rise outward in the thickness direction so that the thickness of the print medium M reaches the height corresponding to the density of the shading image formed on each of the surface FS of the expansion layer M1 and surface BS of the base material M2 and also is greater than the thickness of the print medium M before heating.

The computer 10 is a computing unit including a processor 11, memory 12, and a storage 13, as illustrated in FIG. 1. The computer 10 generates image data through the execution of a program by the processor 11, and outputs print data corresponding to the image data to the printer 40. The display device 20 is, for example, a liquid crystal display, an organic electroluminescent (EL) display, or a cathode ray tube (CRT) display, and displays an image according to a signal from the computer 10. The input device 30 is, for example, a keyboard, a mouse, etc., and outputs a signal to the computer 10.

The printer 40 is a printing unit in the structure formation apparatus, and is an inkjet printer that prints the print medium M based on input print data. The printer 40 includes a carriage 41 capable of reciprocating in the direction (main scan direction D2) indicated by the two-headed arrow orthogonal to the medium conveyance direction (sub-scan direction D1), as illustrated in FIG. 3. A print head 42 for executing printing and ink cartridges 43 (43k, 43c, 43m, 43y) storing ink are attached to the carriage 41. The cartridges 43k, 43c, 43m, and 43y respectively store color inks of black K, cyan C, magenta M, and yellow Y. The ink of each color is ejected from a corresponding nozzle of the print head 42.

The carriage 41 is slidably supported by a guide rail 44, and sandwiched by a drive belt 45. When the drive belt 45 is driven by rotating a motor 45m, the carriage 41 moves in the main scan direction D2 together with the print head 42 and the ink cartridge 43. A platen 48 extending in the main scan direction D2 is placed in the lower part of a frame 47 at the position facing the print head 42. Moreover, a feed roller pair 49a (the lower roller is not illustrated) and a discharge roller pair 49b (the lower roller is not illustrated) are arranged to convey the print medium M supported on the platen 48 in the sub-scan direction D1.

A control unit of the printer 40 connected to the print head 42 via a flexible communication cable 46 controls the motor 45m, the print head 42, the feed roller pair 49a, and the discharge roller pair 49b, based on print data and print control data from the computer 10. Thus, a density image and/or a color image is printed on the print medium M.

The heater 50 is an irradiation unit in the structure formation apparatus, and is a device that heats the print medium M by irradiating it with electromagnetic waves. The heater 50 includes a placement table 51 having guide grooves 52, a support 53 supporting a light source unit 54, and the light source unit 54 including a light source, as illustrated in FIG. 4. The print medium M with a density image printed thereon is placed on the placement table 51. The support 53 slides (moves) along the guide grooves 52. The light source in the light source unit 54 emits electromagnetic waves.

In the heater 50, the light source unit 54 moves in the direction D3 together with the support 53 while emitting electromagnetic waves, to irradiate the print medium M uniformly with the electromagnetic waves. In the region in which the density image is printed, the electromagnetic waves are more efficiently absorbed and converted into heat than in the region in which the density image is not printed. In the region in which the density image is not printed, the electromagnetic waves are substantially not absorbed and converted into heat. Thus, the region corresponding to the density image is heated and expands to form a structure corresponding to the density image.

In the case where the density image is printed in ink of black K including carbon black, the electromagnetic waves are desirably infrared. The wavelength range of the electromagnetic waves is, however, not particularly limited as long as the electromagnetic waves are more efficiently absorbed for heating in the region printed in ink of black K than in the region not printed in ink of black K.

Figure 5:
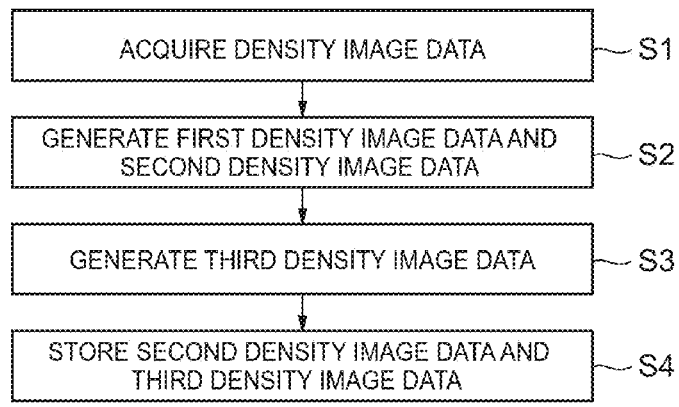
FIG. 5 is a flowchart illustrating an image data generation process.
Figure 6:
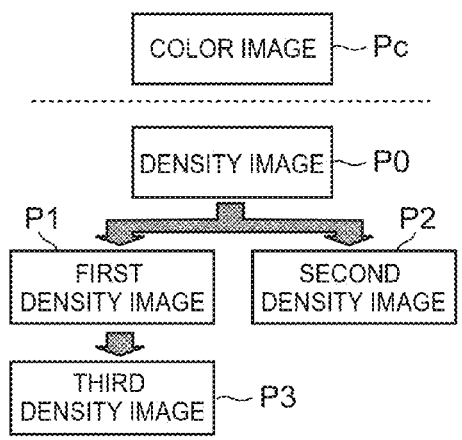
FIG. 6 is a diagram illustrating the relationship between images.
Figure 7:
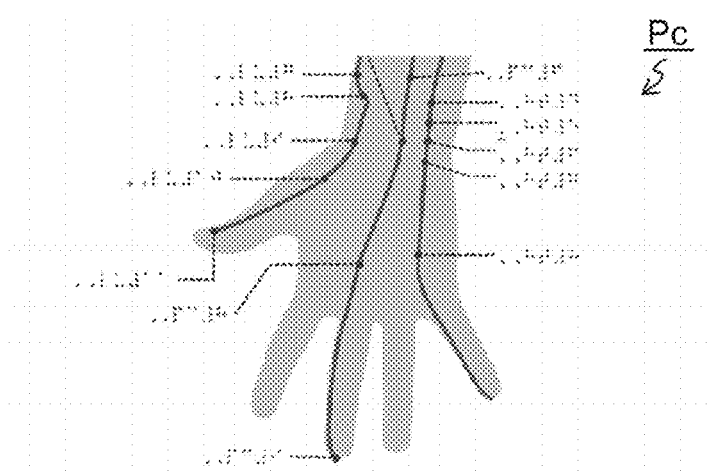
FIG. 7 is a diagram illustrating a color image.
Figure 8:
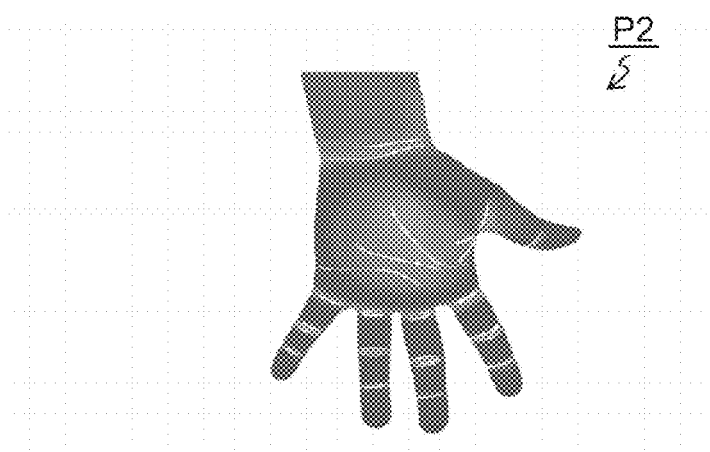
FIG. 8 is a diagram illustrating a second density image.
Figure 9:
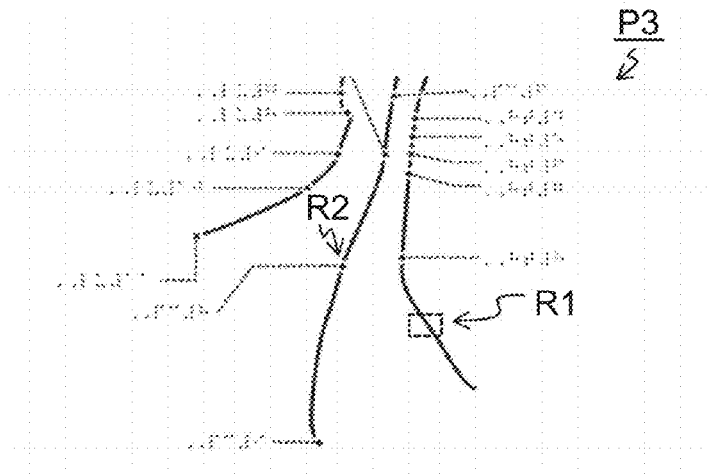
FIG. 9 is a diagram illustrating a third density image.

FIG. 5 is a flowchart illustrating an image data generation process. FIG. 6 is a diagram illustrating the relationship between images used in the image data generation process illustrated in FIG. 5. FIGS. 7, 8, and 9 are diagrams respectively illustrating a color image, a second density image, and a third density image. FIGS. 10 and 11 are diagrams for describing a density conversion process. The following describes the image data generation process illustrated in FIG. 5 in detail with reference to FIGS. 5 to 11, using an example of forming a colored structure representing a person's palm in the print medium M.

Before starting the image data generation process in FIG. 5, a color image Pc and a density image P0 are prepared. The color image Pc is an image formed with three colors of ink of cyan C, magenta M, and yellow Y, and is an image for coloring the structure formed in the print medium M. Note that the color image Pc is used in the below-mentioned structure formation process illustrated in FIG. 12. The density image P0 is an image formed with ink of black K, and an image representing, by the density of black, the height of each micro region of the structure formed in the print medium M.

When an image data generation instruction is input to the computer 10, the computer 10 executes a predetermined program, to start the image data generation process illustrated in FIG. 5. First, the computer 10 acquires the image data (hereafter referred to as "density image data") of the density image P0 prepared beforehand (step S1).

After this, the computer 10 generates first density image data and second density image data based on the density image data (step S2). The first density image data is the image data of a first density image P1 representing, in density, the height of each relatively fine part of the structure to be formed in the print medium M. For example, in the case of forming a structure colored by the color image Pc in FIG. 7, parts such as pressure points and paths on the human hand and braille for explaining such pressure points and paths are represented by the first density image P1. The first density image data is data for printing on the surface FS of the print medium M, i.e. the surface FS closer to the expansion layer M1. The second density image data is the image data of a second density image P2 representing, in density, the height of each relatively rough part of the structure to be formed in the print medium M as compared with the first density image P1. For example, in the case of forming the structure colored by the color image Pc in FIG. 7, the parts of the human hand are represented by the second density image P2 as illustrated in FIG. 8. The second density image data is data for printing on the surface BS of the print medium M, i.e. the surface BS farther from the expansion layer M1.

In step S2, for example, the computer 10 may extract, from the density image P0, each part satisfying a predetermined condition that includes at least one of relatively high spatial frequency, relatively small area, and relatively small width, generate the first density image P1 representing, in density, the height of each relatively fine structural part based on the extracted part, and output the first density image data representing the first density image P1. The computer 10 may also extract, from the density image P0, each part satisfying a predetermined condition that includes at least one of relatively low spatial frequency, relatively large area, and relatively large width, generate the second density image P2 representing, in density, the height of each relatively rough structural part based on the extracted part, and output the second density image data representing the second density image P2. The thresholds in this case can be set as appropriate to meet the object of the present invention. Alternatively, the computer 10 may output each structural part designated by the user as the first density image data, and the other structural parts as the second density image data.

In the case of forming a fine structure on a base structure, the first density image data and the second density image data can include data of the same region. For example, in the case of three-dimensionally representing the pressure spots and paths on the palm as illustrated in FIG. 7, the second density image data may include data of the height of the palm in a region, and the first density image data include data of the height of each pressure point or path formed on the palm in the same region.

Once the first density image data and the second density image data have been generated, the computer 10 generates third density image data (step S3). The processor 11 in the computer 10 functions as a generation unit for generating the third density image data by converting the first density image data so that the density of a part of a target region having the same density in the first density image P1 is higher than the density of the other part of the target region. In detail, first the target region which is a continuous region of the same density is extracted from the first density image P1. The target region is typically in the shape of a line or a dot, but may have any other shape. The processor 11 in the computer 10 then functions as a selection unit for selecting a partial region from the target region. The selected region is desirably a center region surrounded by the other region of the target region. The selected region which is a part of the target region is desirably half in size of the target region having the same density. The expression "half in size" here means half in area or half in width. Particularly in the case where the target region is in the shape of a line, "half in size" means half in width. The area of the selected region is, for example, about ½ of the area of the target region.

Lastly, the first density image data is converted so that the density of the selected region is higher than the density of the other region. For example, the first density image data is converted so that the density of the selected region is higher than the original density (the aforementioned same density). The density of the selected region is, for example, twice or more the original density (the aforementioned same density). The image data (third density image data) of a third density image P3 as illustrated in FIG. 9 is thus generated.

Here, if the original density (the aforementioned same density) is higher than predetermined density, the density of the selected region becomes high, too, which causes most of the heat absorbed by the ink of black K to spread in the lateral direction and results in an increase in width. It is therefore preferable to generate the image data of the third density image P3 in the case where the original density (the aforementioned same density) is not greater than the predetermined density. For example, it is preferable that the original density (the aforementioned same density) is 30% to 50% of the highest density of black K, and the density of the selected region is 60% to 100% of the highest density of black K. The highest density of black K is 100%.

Moreover, the area of the target region is preferably larger than a predetermined area (size). For example, the target region is desirably a line of 1.5 mm or more in width (thickness) or a circle (dot) of 0.75 mm or more in radius. If the target region is too small (too narrow), the selected region is small, too. This not only makes it difficult to set the selected region, but also may cause most of the heat absorbed by the ink of black K to spread in the lateral direction and result in an increase in width. Therefore, the area of the target region is preferably larger than the predetermined area (size).

Figure 10A:
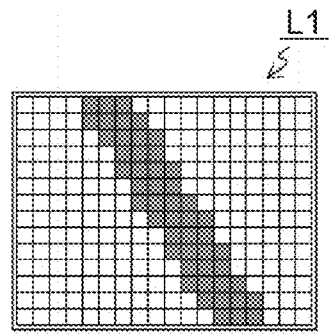
FIGS. 10A and 10B are diagrams for describing a density conversion process.
Figure 10B:
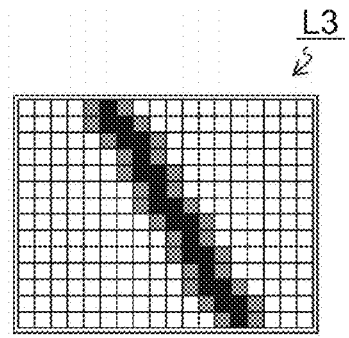

An image L1 illustrated in FIG. 10A and an image L3 illustrated in FIG. 10B are each an image of a region R1 illustrated in FIG. 9. The image L1 is a part of the first density image P1 before the density conversion process, where a line-shaped target region is represented in the same density. The image L3 is a part of the third density image P3 after the density conversion process, where the density of the center part of the line-shaped target region is higher than the density of its surrounding part. For example, the density of the center part of the line-shaped target region is 30% to 50% of the highest density of black K, and the density of the surrounding part is 60% to 100% of the highest density of black K. The width of the line shape is preferably 1.5 mm or more.

Figure 11A:
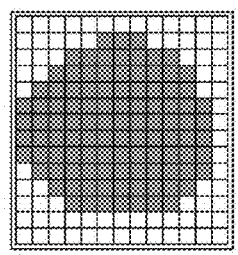
FIGS. 11A and 11B are other diagrams for describing the density conversion process.
Figure 11B:
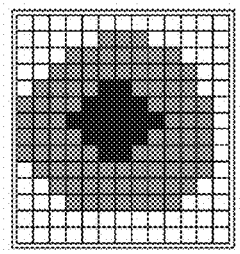

An image D1 illustrated in FIG. 11A and an image D3 illustrated in FIG. 11B are each an image of a region R2 illustrated in FIG. 9. The image D1 is a part of the first density image P1 before the density conversion process, where a dot-shaped target region is represented in the same density. The image D3 is a part of the third density image P3 after the density conversion process, where the density of the center part of the dot-shaped target region is higher than the density of the surrounding part. For example, the density of the center part of the dot-shaped target region is 30% to 50% of the highest density of black K, and the density of the surrounding part is 60% to 100% of the highest density of black K. The radius of the dot shape is preferably 0.75 mm or more.

Once the third density image data has been formed, the computer 10 stores the second density image data and the third density image data in the storage 13 (step S4), and ends the image data generation process in FIG. 5.

Figure 12:
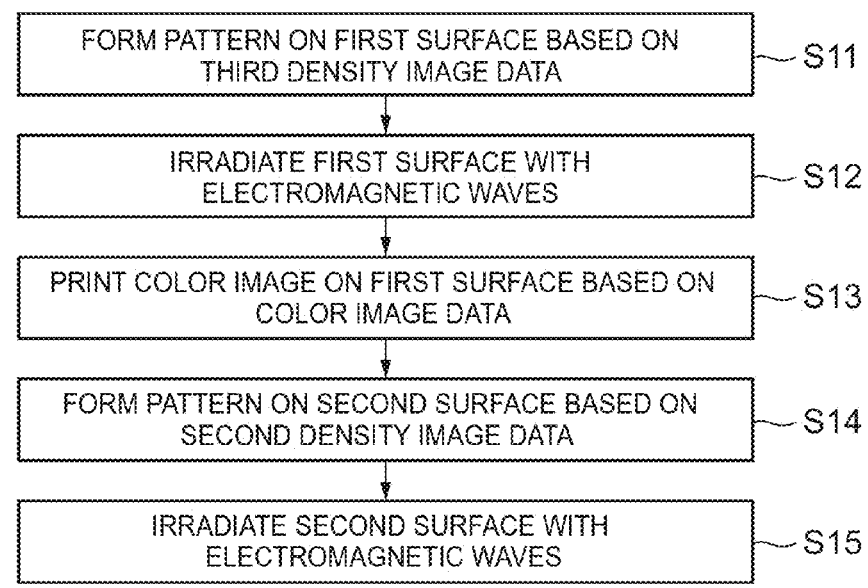
FIG. 12 is a flowchart illustrating a structure formation process.

FIG. 12 is a flowchart illustrating a structure formation process. FIGS. 13A-13E are sectional views for describing each step of the structure formation process. The following describes the structure formation process using the image data generated by the image data generation process in FIG. 5, with reference to FIGS. 12 and 13.

The structure formation system 1 forms a pattern on the surface FS (first surface) based on the third density image data (step S11). First, the user sets the print medium M on the printer 40 so that the surface FS faces the print head 42, and inputs an instruction to print the third density image P3 to the computer 10. The computer 10 responsively generates the print data and print control data corresponding to the third density image P3, and outputs the generated data to the printer 40. The printer 40 forms a pattern (first pattern) on the surface FS of the print medium M in ink of black K, based on the print data and print control data. The third density image P3 is thus formed on the surface FS. The printer 40 controls the print density by, for example, area coverage modulation.

Figure 13A:
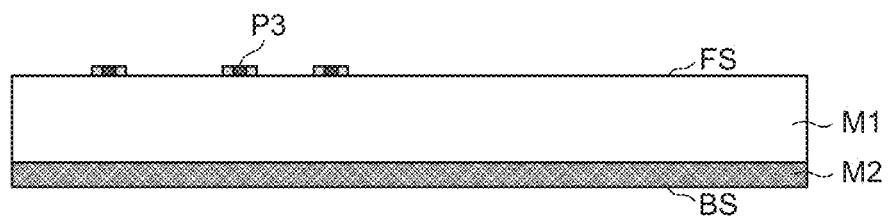
FIGS. 13A-13E are sectional views for describing each step of the structure formation process.

FIG. 13A is a sectional view of the print medium M with the third density image P3 printed on the surface FS. FIG. 13A illustrates a state where a region of high density exists in the center part of each target region in the third density image P3.

Next, the structure formation system 1 irradiates the surface FS (first surface) with electromagnetic waves (step S12). First, the user places the print medium M on which the third density image P3 has been printed, on the placement table 51 of the heater 50 in a state where the surface FS faces upward. The heater 50 then irradiates the surface FS of the print medium M uniformly with electromagnetic waves such as infrared. Hence, the region corresponding to the third density image P3 is heated and expands, as a result of which a relatively fine structure is formed.

Figure 13B:
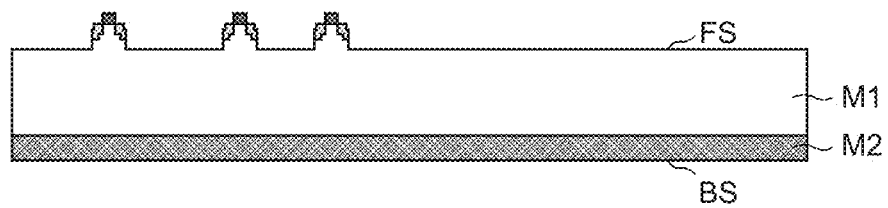

FIG. 13B is a sectional view of the print medium M after irradiating the surface FS with electromagnetic waves. FIG. 13B illustrates a state where, despite the relatively fine structure formed on the surface FS having uniform density in the surrounding part of the target region, a part closer to the center part rises higher. FIG. 13B also illustrates a state where the relatively fine structure is higher in the center part than the surrounding part of the target region. Thus, the cross-sectional shape of the relatively fine structure corresponding to each target region formed on the surface FS is relatively tapered outward in the thickness direction of the print medium M.

After this, the structure formation system 1 prints a color image on the surface FS (first surface) based on color image data (step S13). First, the user sets the print medium M on the printer 40 so that the surface FS on which the relatively fine structure has been formed faces the print head 42, and inputs an instruction to print the color image Pc to the computer 10. The computer 10 responsively generates the print data and print control data corresponding to the color image Pc, and outputs the generated data to the printer 40. The printer 40 prints the color image in ink of the colors of cyan C, magenta M, and yellow Y on the surface FS of the print medium M, based on the print data and print control data.

Figure 13C:
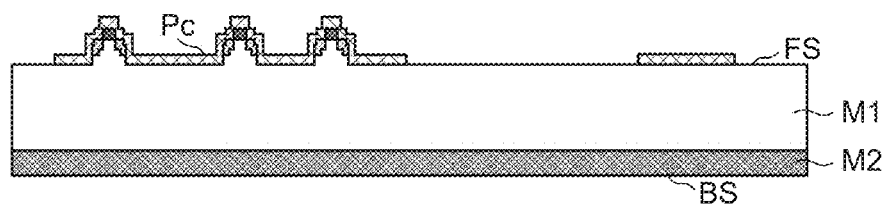

FIG. 13C is a sectional view of the print medium M after printing the color image Pc on the surface FS. FIG. 13C illustrates a state where the color image Pc has been printed in a given region of the surface FS. The structure corresponding to the third density image P3 formed on the surface FS is relatively fine as compared with the below-mentioned structure corresponding to the second density image P2, and has the maximum height not greater than a predetermined height. Accordingly, the relatively fine structure formed on the surface FS does not obstruct the printing of the color image Pc by the printer 40, and a decrease in printing quality hardly occurs. The predetermined height may be any height not greater than such height that enables printing without a decrease in printing quality even when a general-purpose inkjet printer or laser printer for home use which is incapable of moving the print head up and down is used. For example, the predetermined height is 0.5 mm.

After the printing of the color image ends, the structure formation system 1 forms a pattern on the surface BS (second surface) based on the second density image data (step S14). First, the user sets the print medium M on the printer 40 so that the surface BS faces the print head 42, and inputs an instruction to print the second density image P2 to the computer 10. The computer 10 responsively generates the print data and print control data corresponding to the second density image P2, and outputs the generated data to the printer 40. The printer 40 forms a pattern (second pattern) on the surface BS of the print medium M in ink of black K, based on the print data and print control data. The second density image P2 is thus printed on the surface BS.

Figure 13D:
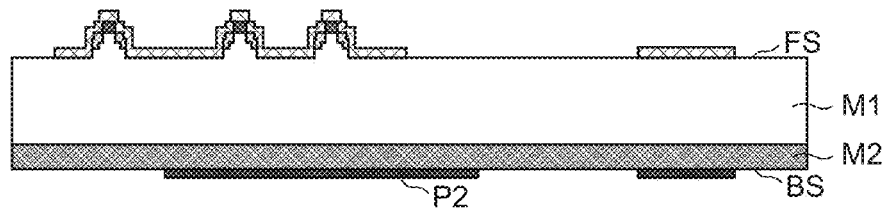

FIG. 13D is a sectional view of the print medium M with the second density image P2 printed on the surface BS. FIG. 13D illustrates a state where a wide target region has been formed on the surface BS as compared with the surface FS on which the third density image P3 has been printed.

Lastly, the structure formation system 1 irradiates the surface BS (second surface) with electromagnetic waves (step S15), and ends the structure formation process in FIG. 12. First, the user places the print medium M on which the second density image P2 has been printed, on the placement table 51 of the heater 50 in a state where the surface BS faces upward. The heater 50 then irradiates the surface BS of the print medium M uniformly with electromagnetic waves such as infrared. Hence, the region of the expansion layer M1 corresponding to the second density image P2 is heated through the base material M2 and expands, as a result of which a relatively rough structure is formed.

Figure 13E:
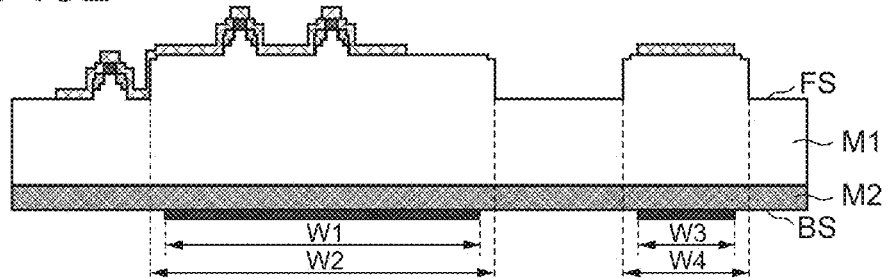
Figure 14A:
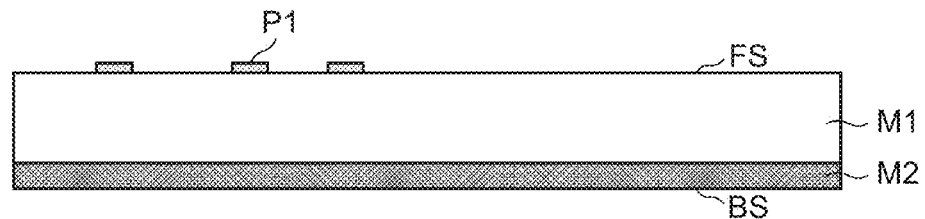
FIGS. 14A-14E are sectional views for describing each step of a structure formation process according to a comparative example.
Figure 14B:
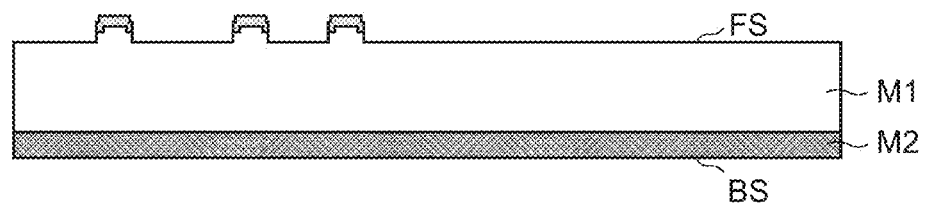
Figure 14C:
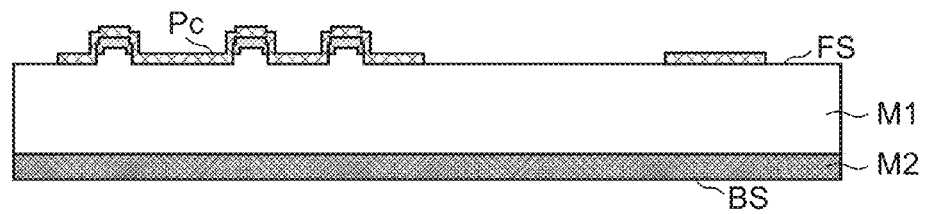
Figure 14D:
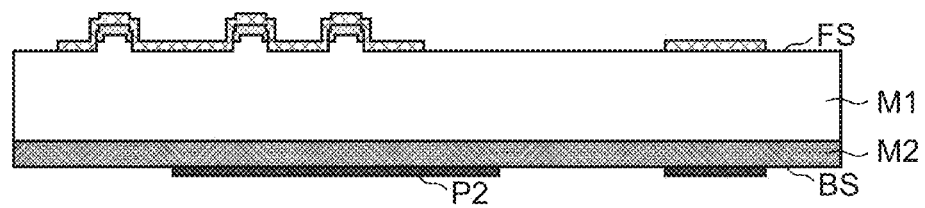
Figure 14E:
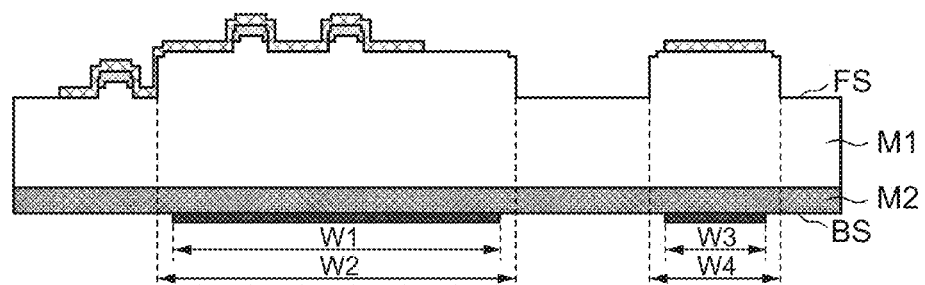

FIG. 13E is a sectional view of the print medium M after irradiating the surface BS with electromagnetic waves. FIG. 13E illustrates a state where the relatively rough structure has been formed as a result of the expansion of a wider region (e.g. the regions with widths W2 and W4) than each target region (e.g. the regions with widths W1 and W3) in the second density image P2. Here, the thickness of the part with the relatively fine structure formed by irradiating the surface FS of the print medium M with electromagnetic waves in step S12 is the sum of the thickness of the relatively fine structure and the thickness of the relatively rough structure formed in step S15.

<Comparative Example>

FIGS. 14A-14E are sectional views for describing each step of a structure formation process according to a comparative example. The comparative examples illustrated in FIGS. 14 14A-14E differ from the foregoing embodiment only in that the first density image P1 having uniform density throughout the target region is formed on the surface FS of the print medium M in step S11 in FIG. 12, and is the same as the foregoing embodiment in the other respects. In a relatively fine structure formed in the comparative examples in FIGS. 14A-14E, the rise in the center part of the target region is smaller than that in FIGS. 13A-13E. In FIGS. 14A-14E, too, despite the relatively fine structure formed on the surface FS having uniform density in the surrounding part of the target region, a part closer to the center part rises higher. The cross-sectional shape of this relatively fine structure is not sharp. Since the relatively fine structure in the comparative example is not sharp, it is relatively hard to be perceived by the sense of touch. As compared with this structure formed by the method according to the comparative example, the structure formed by the method according to this embodiment has a relatively sharp shape, and so is relatively easy to be perceived by the sense of touch.

Thus, the structure formed on the print medium M by the method according to this embodiment is relatively easy to be perceived by the sense of touch, as compared with the structure formed by forming, on the surface FS of the print medium M on the side where the expansion layer M1 is located, the first density image P1 corresponding to the relatively fine structure and having uniform density as a whole and then irradiating the print medium M with electromagnetic waves from the side where the expansion layer M1 is located in the print medium M to cause the surface of the expansion layer M1 to rise. The method according to this embodiment is therefore suitable for use in braille, tactile graphics, etc.

Increasing the density of the whole target region causes an increase in not only height but also width of the formed structure, and may significantly change the visual impression of the structure. With the method described above, however, the third density image P3 in which the density is increased in not the whole target region but part of the target region of the first density image P1 is printed on the print medium M. This prevents an increase in width, and suppresses a change of the visual impression of the structure. Therefore, the tactile information provision function can be improved without impairing the visual information provision function. In particular, the aforementioned advantageous effects are enhanced when the part increased in density is a region surrounded by other regions, e.g. a center region.

Moreover, since the third density image P3 representing the relatively fine structural part is printed on the surface FS closer to the expansion layer M1, the heat absorbed by the ink of black K is transferred to the expansion layer M1 without much spreading in the lateral direction. Hence, the size of the region in which the third density image P3 is printed and the size of the heated region of the expansion layer M1 are substantially equal. This enables the structure to be formed in such a size that faithfully reproduces the third density image. A fine structure can be formed accurately in this way.

The ink of black K of the density image printed on the surface FS can cause lower display quality of the color image, by making the color image formed thereon appear darker. With the aforementioned method, however, the ink of black K is ejected only to the part forming the relatively fine structure on the surface FS, with it being possible to reduce the region of the color image appearing darker. In the case where the relatively fine structure is a part that can be represented in black color such as braille, characters, or leader lines in drawings, the tone of the ink of black K of the density image printed based on the third density image data itself can be used.

The foregoing embodiment shows a specific example to help understanding the present invention, and the present invention is not limited to this embodiment. Various changes or modifications can be made to the image data generation method, the structure formation method, and the program without departing from the scope of the present invention as defined in the claims.

Although FIG. 3 illustrates the inkjet printer, the printer is not limited to an inkjet printer. Any printer such as a laser printer may be used. Although FIG. 4 illustrates the heater in which the light source unit moves relative to the print medium M, the heater may be any heater that irradiates the print medium M uniformly with electromagnetic waves. For example, the print medium M may move relative to the fixed light source unit. Alternatively, the heater may include such a light source unit that irradiates the whole print medium M with electromagnetic waves simultaneously.

Although FIG. 5 illustrates an example of generating the first density image data and the second density image data and then generating the third density image data, the third density image data may be generated at any timing after the generation of the first density image data. The generation of the third density image data may be before or after the generation of the second density image data.

Although the foregoing embodiment describes the case where the first density image data and the second density image data are prepared by being generated by the computer 10, the first density image data and the second density image data may be prepared by reading, into the memory 12, the first density image data and second density image data stored in the storage 13 beforehand, or by receiving the first density image data and second density image data generated by another computer connected to the computer 10 via the Internet or a local area network or stored in a storage of the other computer beforehand via the network and reading the received data into the memory 12.

Although FIGS. 10 and 11 illustrate the density conversion process of increasing the density of the center part of the target region, the density conversion process may be any process of increasing the density of a part of the target region as compared with the other part. For example, the density of one edge part of a line-shaped target region may be higher than the density of the other part.

Although FIG. 12 illustrates an example of forming the pattern on the second surface (surface BS) after irradiating the first surface (surface FS) with electromagnetic waves, the first surface and the second surface may be irradiated with electromagnetic waves after forming the corresponding pattern on each of the surfaces. Although FIG. 12 illustrates an example of printing the color image after irradiating the first surface (surface FS) with electromagnetic waves, the color image may be printed before the irradiation with electromagnetic waves unless the ink for forming the color image contains a material, such as carbon black, that efficiently absorbs electromagnetic waves and converts them into heat.

Although FIG. 12 illustrates an example of performing the plurality of processes after forming the pattern on the first surface (surface FS), the processes subsequent to the formation of the pattern on the first surface (surface FS) may be omitted. The print medium M with the pattern formed on the first surface (surface FS) may be sold, with the subsequent processes being performed optionally by the purchaser. In detail, the seller may perform, from among the plurality of processes in FIG. 12, the processes other than at least one process and sell the formed print medium, and the purchaser perform the at least one process optionally. For example, the seller performs the processes up to step S11 in FIG. 12 to form the print medium M on which the first density image has been formed as in FIG. 13A and sells the print medium M, and the purchaser performs the processes from step S12 in FIG. 12. Any other combination of the processes performed by the seller and purchaser is applicable.

Although the foregoing embodiment describes the case where both the color image Pc and the density image P0 are prepared, only the color image Pc may be prepared so that the density image P0 is generated based on the color image Pc.

Although the foregoing embodiment describes the case where two sets of density image data are generated and printed on the assumption of performing double-side printing on the print medium M, the aforementioned technique is also applicable to one-side printing. As an example, a target region having the same density in an input density image (e.g. density image P0) is selected based on a predetermined condition, and the image data of the input density image is converted so that the density of the part of the selected target region is higher than the density of the other part of the target region, thus generating image data of an output density image. By setting the predetermined condition so that a fine structural part is selected, the image data of the output density image that combines the second density image P2 and the third density image P3 can be generated. The generated output density image is then printed on the surface FS and the surface FS is irradiated with electromagnetic waves, as a result of which a structure in which the shape of a relatively fine structural part is sharp can be formed. With this method, too, the tactile information provision function through a structure can be improved from conventional techniques.

What is claimed is:

1. An image data generation method performed by a structure formation apparatus, the method comprising:
   preparing first density image data representing a first density image; and
   generating third density image data from the first density image data, the third density image data being for printing on a first surface of a print medium including an expansion layer to expand the expansion layer, the first surface being on a side of the print medium where the expansion layer is located, and the expansion layer being configured to expand by heating;
   wherein generating the third density image data comprises converting the first density image data into the third density image data such that, in the third density image data, a density of a first part of a target region is higher than a density of a second part of the target region, the target region being a region having a same pre-conversion density in the first density image.

2. The image data generation method according to claim 1, further comprising:
   preparing second density image data for printing on a second surface of the print medium opposite to the side where the expansion layer is located to expand the expansion layer,
   wherein the first density image includes information of a finer structure than a second density image represented by the second density image data.

3. The image data generation method according to claim 1, wherein generating the third density image data comprises converting the first density image data into the third density image data such that, in the third density image data, the density of the first part of the target region is higher than the same pre-conversion density of the target region.

4. The image data generation method according to claim 3, wherein generating the third density image data comprises converting the first density image data into the third density image data such that, in the third density image data, the density of the first part of the target region is at least twice the same pre-conversion density of the target region.

5. The image data generation method according to claim 4, wherein generating the third density image data comprises converting the first density image data into the third density image data such that, in the third density image data, the density of the first part of the target region is at least twice the same pre-conversion density of the target region, in a case in which the same pre-conversion density is lower than a predetermined density.

6. The image data generation method according to claim 1, wherein the first part of the target region is surrounded by the second part of the target region.

7. The image data generation method according to claim 1, wherein the first part of the target region is at a center of the target region having the same pre-conversion density.

8. The image data generation method according to claim 1, wherein the first part of the target region is half a size of the target region having the pre-conversion same density.

9. The image data generation method according to claim 1, wherein the target region is a line-shaped or dot-shaped region.

10. The image data generation method according to claim 1, further comprising:
    forming a first pattern on the first surface of the print medium, based on the third density image data; and
    irradiating the first surface of the print medium with electromagnetic waves.

11. The image data generation method according to claim 10, further comprising:
    forming a second pattern representing a rougher structure than the first pattern on a second surface of the print medium opposite to the side where the expansion layer is located, based on second density image data; and
    irradiating the second surface of the print medium with the electromagnetic waves, after irradiating the first surface of the print medium with the electromagnetic waves.

12. A structure formation apparatus comprising:
    a processor configured to execute a program to perform operations including:
    preparing first density image data representing a first density image; and
    generating third density image data from the first density image data, the third density image data being for printing on a first surface of a print medium including an expansion layer to expand the expansion layer, the first surface being on a side of the print medium where the expansion layer is located, and the expansion layer being configured to expand by heating;
    wherein generating the third density image data comprises converting the first density image data into the third density image data such that, in the third density image data, a density of a first part of a target region is higher than a density of a second part of the target region, the target region being a region having a same pre-conversion density in the first density image.

13. The structure formation apparatus according to claim 12, further comprising:

a printer configured to form a first pattern on the first surface of the print medium, based on the third density image data; and a heater configured to irradiate the first surface of the print medium with electromagnetic waves.

14. The structure formation apparatus according to claim 13, wherein:

the printer is configured to form a second pattern representing a rougher structure than the first pattern on a second surface of the print medium opposite to the side where the expansion layer is located, based on second density image data; and the heater is configured to irradiate the second surface of the print medium with the electromagnetic waves.

15. The structure formation apparatus according to claim 14, wherein the heater is configured to irradiate the second surface of the print medium with the electromagnetic waves, after irradiating the first surface of the print medium with the electromagnetic waves.

16. The structure formation apparatus according to claim 12, wherein the first part of the target region is surrounded by the second part of the target region.

17. A non-transitory computer-readable storage medium having a program stored thereon that is executed by a computer of a structure formation apparatus to perform processes comprising:

preparing first density image data representing a first density image; and generating third density image data from the first density image data, the third density image data being for printing on a first surface of a print medium including an expansion layer to expand the expansion layer, the first surface being on a side of the print medium where the expansion layer is located, and the expansion layer being configured to expand by heating;

wherein generating the third density image data comprises converting the first density image data into the third density image data such that, in the third density image data, a density of a first part of a target region is higher than a density of a second part of the target region, the target region being a region having a same pre-conversion density in the first density image.

18. The non-transitory computer-readable storage medium according to claim 17, the processes further comprising:

forming a first pattern on the first surface of the print medium, based on the third density image data; and irradiating the first surface of the print medium with electromagnetic waves.

19. The non-transitory computer-readable storage medium according to claim 17, the processes further comprising:

forming a second pattern representing a rougher structure than the first pattern on a second surface of the print medium opposite to the side where the expansion layer is located, based on second density image data; and irradiating the second surface of the print medium with the electromagnetic waves.

20. The non-transitory computer-readable storage medium according to claim 17, wherein the first part of the target region is surrounded by the second part of the target region.

* * * * *